United States Patent
Kaya

(10) Patent No.: US 9,095,826 B2
(45) Date of Patent: Aug. 4, 2015

(54) APPARATUS AND PROCESS FOR WASTEWATER TREATMENT AND BIOLOGICAL NUTRIENT REMOVAL IN ACTIVATED SLUDGE SYSTEMS

(75) Inventor: Isin Kaya, Waterloo (CA)

(73) Assignee: Ekologix Earth-Friendly Solutions Inc., Waterloo, ON (CA)

( * ) Notice: Subject to any disclaimer, the term of this patent is extended or adjusted under 35 U.S.C. 154(b) by 756 days.

(21) Appl. No.: 12/992,598

(22) PCT Filed: Jun. 10, 2008

(86) PCT No.: PCT/CA2008/001106
§ 371 (c)(1),
(2), (4) Date: Jan. 10, 2011

(87) PCT Pub. No.: WO2009/149536
PCT Pub. Date: Dec. 17, 2009

(65) Prior Publication Data
US 2011/0120945 A1    May 26, 2011

(51) Int. Cl.
*B01F 5/02* (2006.01)
*B01F 3/08* (2006.01)
*B01F 5/04* (2006.01)
*B01F 5/10* (2006.01)
*C02F 3/12* (2006.01)
*C02F 3/30* (2006.01)

(52) U.S. Cl.
CPC ............. *B01F 5/0212* (2013.01); *B01F 3/0865* (2013.01); *B01F 3/0876* (2013.01); *B01F 5/0415* (2013.01); *B01F 5/10* (2013.01); *C02F 3/1284* (2013.01); *C02F 3/1294* (2013.01); *C02F 3/302* (2013.01); *Y02W 10/15* (2013.01)

(58) Field of Classification Search
USPC ......... 210/601, 629, 631, 805, 220, 616, 620, 210/150
See application file for complete search history.

(56) References Cited

U.S. PATENT DOCUMENTS

| | | | | |
|---|---|---|---|---|
| 2,128,311 | A | * | 8/1938 | Mertes .......................... 423/104 |
| 3,206,032 | A | * | 9/1965 | Nottingham et al. ....... 210/195.3 |
| 3,271,304 | A | * | 9/1966 | Cox et al. ..................... 210/621 |
| 3,723,545 | A | * | 3/1973 | Nagel et al. .................. 568/855 |

(Continued)

FOREIGN PATENT DOCUMENTS

WO    WO2007/089113    *  9/2007    ............... C02F 3/20

*Primary Examiner* — Chester Barry
(74) *Attorney, Agent, or Firm* — Anthony Asquith Corp.

(57) ABSTRACT

An apparatus (100) and process (400) for the treatment of wastewater and biological nutrient removal in activated sludge systems. The process uses substantially vertically downwardly presented inlet jets for delivering the incoming wastewater and recycled activated sludge into the body of liquid in a reactor, in a vertically downward direction and at a location just below the surface of the body of liquid. An effective circulating flow pattern of liquid is thereby established, along with optional concomitant entraining, dispersion or dissolving a fluid throughout the volume of the liquid body, facilitating a universal apparatus for mixing of anaerobic, anoxic, aerobic and oxic reactors or accommodating alternating said process conditions in one reactor. When an oxygen containing gas is entrained for aerobic fermentation, optimum gas bubble size is generated for efficient reaction with the digestion bacteria throughout the volume of the liquid body. Efficient mixing and maximum utilization of the bacteria suspended in the body of liquid is thereby approached, whether the digestion is conducted aerobically, anaerobically or anoxically.

18 Claims, 11 Drawing Sheets

(56) References Cited

U.S. PATENT DOCUMENTS

| | | | | |
|---|---|---|---|---|
| 4,100,073 A | * | 7/1978 | Hopcroft | 210/532.1 |
| 4,112,025 A | * | 9/1978 | Wilson et al. | 261/29 |
| 4,162,970 A | * | 7/1979 | Zlokarnik | 210/620 |
| 4,162,971 A | * | 7/1979 | Zlokarnik et al. | 210/620 |
| 4,211,733 A | * | 7/1980 | Chang | 261/36.1 |
| 4,290,885 A | * | 9/1981 | Kwak | 210/197 |
| 4,534,862 A | * | 8/1985 | Zlokarnik | 210/221.2 |
| 4,705,634 A | * | 11/1987 | Reimann et al. | 210/616 |
| 4,863,606 A | * | 9/1989 | Ryall | 210/605 |
| 5,126,042 A | * | 6/1992 | Malone | 210/150 |
| 5,340,549 A | * | 8/1994 | Ajinkya et al. | 422/230 |
| 5,409,610 A | * | 4/1995 | Clark | 210/603 |
| 5,458,779 A | * | 10/1995 | Odegaard | 210/616 |
| 5,486,292 A | * | 1/1996 | Bair et al. | 210/616 |
| 5,783,118 A | * | 7/1998 | Kolaini | 261/37 |
| 6,077,424 A | * | 6/2000 | Katsukura et al. | 210/151 |
| 6,726,838 B2 | * | 4/2004 | Shechter et al. | 210/150 |
| 7,294,261 B2 | * | 11/2007 | McKinney | 210/220 |
| 7,722,769 B2 | * | 5/2010 | Jordan et al. | 210/616 |
| 8,241,717 B1 | * | 8/2012 | Anderson | 428/35.6 |
| 2009/0008311 A1 | * | 1/2009 | Lee | 210/194 |

* cited by examiner

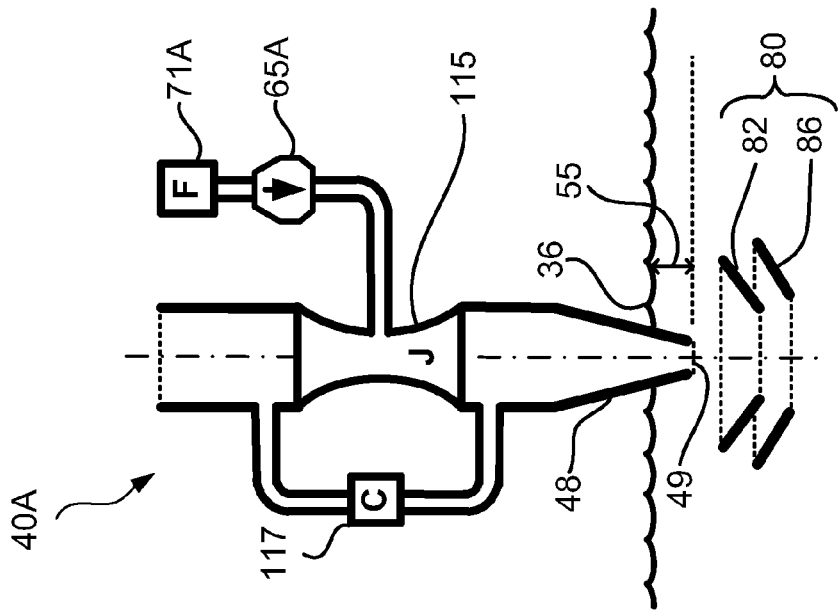
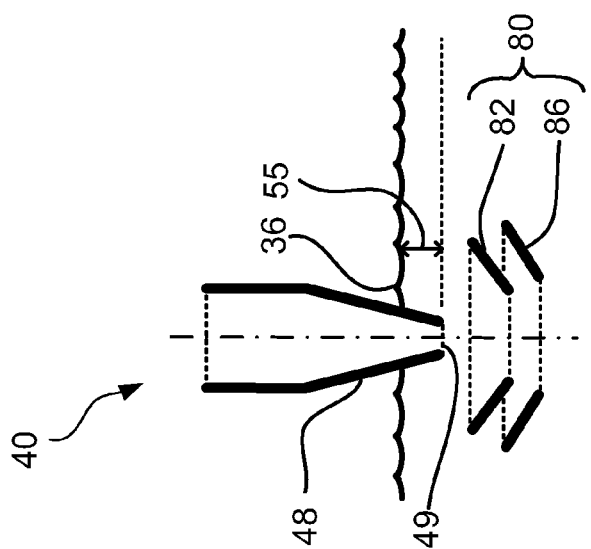
Fig. 1(a)
Fig. 1(b)

APPARATUS AND PROCESS FOR WASTEWATER TREATMENT AND BIOLOGICAL NUTRIENT REMOVAL IN ACTIVATED SLUDGE SYSTEMS

BACKGROUND

1. Field of the Invention

This invention pertains generally to an apparatus and process for the treatment of wastewater and biological nutrient removal in activated sludge systems. The apparatus facilitates universal equipment providing substantially steady agitation while accommodating alternating process conditions (such as anaerobic, anoxic, aerobic, and oxic conditions) in a reactor.

2. Prior-Art

Municipal and industrial wastewaters contain significant quantities of phosphorus and nitrogen, and the removal of these nutrients has become an important facet of wastewater treatment. In a wastewater treatment plant, phosphorus and nitrogen can be removed by both biological and physical chemical means. Biological means of nutrient removal are generally preferred, as they result in lower waste sludge production, produce a sludge that is more amenable to land application, and have the public perception that biological processes are more "environmentally friendly" than chemical processes. Processes using biological mechanisms for phosphorus and nitrogen removal are generally referred to as biological nutrient removal, or BNR, processes.

Biological nitrogen removal in the activated sludge process takes place in two sequential reactions—nitrification and denitrification. Nitrification is the biological oxidation of ammonia to nitrate and nitrite by two specialized groups of autotrophic bacteria that takes place under aerobic conditions. Denitrification is the biological reduction of nitrate and nitrite to nitrogen gas that takes place under anoxic conditions. During the 1960s, North American research focused on the development of two- and three-stage processes for nitrogen removal, with separate stages for carbon removal, nitrification, and denitrification. Each stage had the prerequisite conditions required to sustain its biological reaction followed by a set of clarifiers. Researchers in Europe, meanwhile, developed single sludge systems in which all of these reactions take place simultaneously in a single process in which the sludge is sequentially subjected to anoxic and aerobic conditions. Recent examples of single sludge applications are SHARON (Single reactor system for High activity Ammonium Removal Over Nitrite) and ANAMMOX (ANoxic AMMonium OXidation).

Some of the technologies focused on satisfying high oxygen requirement per unit volume and therefore targeted to hold more biological activated sludge in activated sludge reactors. For example, UNOX system developed in the 1960s used high purity oxygen (HPO) as an alternative to air provided by surface aerators and upgraded existing aerobic reactors by simply altering the same infrastructure and covering aeration tanks. In the 1970s, open-tank HPO systems were developed such as the BOC VITOX system by British Oxygen Company, eliminated the confined space limitations and exhaust-gas troubles of the UNOX system and also made possible to have deeper aeration tanks in resulting footprint reduction and capital cost savings.

In the late 1980s, by incorporating an engineered plastic media to activated sludge system Moving Bed Bio-Reactor (MBBR) systems were developed and combined suspended-growth and attached-growth advantages into one system. By adding a recycle activated sludge line to the MBBR system, integration of suspended-growth and attached-growth was further enhanced and was referred to as Integrated Fixed-film Activated Sludge (IFAS). In the 1990s, the Membrane Bioreactor (MBR) was developed as a robust solid-separation mechanism, and integrated into activated sludge systems to meet more stringent suspended solids and phosphorus effluent targets.

MBR, MBBR, and IFAS systems are often called hybrid systems. Most of the hybrid systems' performances rely on aeration method they use. In most existing aeration devices, rate of hydraulic-mixing and degree of aeration are simultaneously dependent on each other as, for example, in surface aerators and air-blowing diffused aeration systems (such as those disclosed in U.S. Pat. No. 6,372,140). When more air is required, more mixing is inadvertently and unnecessarily provided.

Excessive mixing energy and agitation in activated sludge system can cause adverse effects on system performance, such as a pin-floc problem in suspended-growth systems or excessive bio-film sloughing-off in attached-growth systems, which in turn can lead to sedimentation and solids separation problems.

MBR, MBBR and IFAS systems are examples of wastewater treatment systems that are the most vulnerable to the problem of excessive agitation. All of those systems often use diffused aeration and therefore their efficiency relies on that particular aeration method's pros and cons. For example, MBR systems rely on micro-filtration taking place in an activated sludge reactor with high level of suspended solids, and therefore usually require a high degree of agitation in the aeration reactor to keep the membranes' surfaces clean and reduce their reject time. However, excessive agitation has adverse effects on the treatment performance mentioned above. Some of the MBBR and IFAS systems rely on the development of bio-film on small, lightweight, rigid plastic floatable carrier elements that fill the aeration basin and are kept agitated by means of diffused aeration. Homogeneous mixing of MBBR and IFAS plastic floating media has been a challenging issue since the mixing of floating media by means of diffused aeration is more challenging then mixing of settling solids. (Conventional activated sludge systems do not contain artificially added floating media and therefore are relatively less vulnerable to this problem.) Excessive agitation is definitely a serious problem and limiting the theoretically expected actual performance of MBR, MBBR and IFAS systems.

There are commercially available aeration systems that provide an independent aeration-rate with respect to the hydraulic-mixing-rate, such as BOC VITOX, MTSJETS and another system disclosed in patent WO/2001/002308. However, due to their potential high energy requirements (for air blowers or oxygen-generators in addition to liquid recirculation pumps), as well as their complexity in installation, operation, and maintenance, they may not be the best solutions for every single scenario. Most of those systems using jet ejectors suffer from a number of disadvantages, for example:

(a) they are usually horizontally submersed into the liquid adjacent to the bottom of a typically 4 to 6 meters deep reactor. They use high-velocity coherent jets which are adapted to overcome water pressure at the bottom of the reactor, consequently providing high liquid flux and relatively much more energy to entrain desired quantities of atmospheric air. Thus, they are often adapted to feed forced air provided by air blowers which also require additional energy. Despite the optimization efforts the energy utilization per unit volume is still considered high (b) none of them can control entraining gas flow at single nozzle level, the control mechanisms are usually outside and centralized to provide uniform air flowrate to every nozzle. This arrangement is potentially a disadvantage for adjusting aeration levels in a plug-flow reactor.

(c) having submersed jet mixing apparatus approximately 5 meters under water makes the system vulnerable for any operation and maintenance concern such as potential nozzle clogging. In that case, the reactor is required to be emptied or alternatively a professional wastewater diver must be hired for the underwater repair work. There are some retrievable apparatuses also available, but retrieving a 5-meter-wide and 5-meter-tall nozzle manifold is not a simple maintenance job.

The prior art comprises submersed liquid jet ejectors horizontal or with an approximate 45° trajectory angle (to horizontal XY-plane) and vertically plunging jet ejectors over and above the liquid surface. The following are examples of technical articles from plunging liquid jet literature and related prior arts or patents.

H. Chanson, R. Manasseh (2003) "Air entrainment processes in a circular plunging jet: Void Fraction and Acoustic Measurements", Journal of Fluids Engineering, ASME, September 2003 Vol. 125 pg 910.

T. Bagatur and N. Sekerdag (2003) "Air-entraintment characteristics in a plunging water jet system using rectangular nozzles with rounded ends" ISSN 0378-4738, Water SA Vol. 29 No. 1 Jan. 2003.

Ito, K. Yamagiwa et al (2000) "Maximum Penetration depth of Air bubbles entrained by vertical liquid jet", Journal of Chemical Engineering of Japan Vol 33 pg. 898

Liu, G., Evans, G. M., (1998). "Gas entrainment and gas holdup in a confined plunging liquid jet reactor", Proceedings of the 26$^{th}$ Australian Chemical Eng. Conference, (Chemeca 98), Port Douglas, Australia.

The above technical articles focus on a plunging liquid jet over and outside the liquid body where the liquid jet is in contact with the gas above the liquid surface in a reactor so that it will usually entrain ambient gas by the impingement at the liquid surface (such as disclosed in PCT patent applications, WO/2005/108549 and WO/1992/03218).

Based on literature and model study results for the present invention, a jet ejector can generate a ratio of entrained air to motion water 2 to 4 air per water (volume/volume) as also disclosed in U.S. Pat. No. 4,690,764. However, dispersing and effectively dissolving of the entrained gas in an energy-efficient means still remains as a challenge for the prior art and this was mentioned above.

The plunging jet mix prior art suffer from a number of disadvantages:

(a) all of the above plunging jet aerators claim and rely on a jet ejector located over and outside of the liquid to be aerated, therefore air (gas) entraining is dependent on a high-speed coherent jet impingement on a liquid surface which can generate a high ratio of entrained air per liquid flux; however, the more the gas entraining, the less dissolution efficiency. Therefore, those prior art items often utilize relatively excessive hydraulic energy deliberately to shear gas bubbles into very small size to increase bubble penetration depth (energy efficiency suffers).

(b) despite being not very energy efficient, those prior art items have another potential problem: coalescence of small bubbles into larger bubbles due to high concentration of small bubbles and in turn causing dissolution efficiency and unwanted foaming problems.

(c) even though some of those prior art items disclose a controllable gas entraining mechanism, most of them are strictly designed for maximizing gas entrapping by coherent liquid jet impingement and therefore they are not capable of turning the gas completely off and accommodating anaerobic mixing conditions (d) none of those prior art items disclose entraining of any other fluid other than an oxygen-containing gas or air, therefore they are not designed to entering any other fluid to accommodate alternating process conditions such as anaerobic, anoxic, aerobic, and oxic conditions in a liquid reactor (e) none of those prior art items disclose any particular floatable matter de-stratification mechanism in addition to keeping settleable matter in suspension. Most of them do not define specific mixing patterns for energy-efficiency; their focus is strictly on entraining oxygen-containing gas or air since concomitantly provided mixing is usually chaotic and very high in both degree and energy utilization It is an object of the present invention to provide a liquid treatment process and apparatus which reduces at least one of the aforementioned disadvantages.

SUMMARY

In accordance with one aspect of the present invention, efficient mixing and circulation of inputted wastewater into a body of liquid, for micro-organism reaction and digestion throughout the body of liquid, is achieved by delivering the input wastewater or activated sludge in a substantially vertically downward direction in the body of liquid, through a constricted delivery opening (jet) disposed a short distance below the surface of the body of liquid. By suitable, routine adjustment of the input flow rate, the input liquid can be made to travel downwardly to the bottom of the body of liquid initially, and then to move outwardly and upwardly in a circulating manner, throughout a substantial portion of the volume of body of liquid, preferably throughout substantially the entire volume thereof. Efficient mixing and maximum utilization of the bacteria suspended in the body of liquid is thereby approached, whether the digestion is conducted aerobically, anaerobically or anoxically. Treated water can be led off from a location near the surface of the body of liquid, but displaced a significant distance from the input location, to keep the volume of the body of liquid constant.

The disposition of the inlet jet for the wastewater just below the surface of the body of liquid, and delivery in a downward direction, has a number of other advantages, besides the establishment of desirable flow circulation patterns, as described. When, as is commonly but not invariably the case, it is desired to supply oxygen-containing fluid such as air to create aerobic fermentation, the gas can be supplied along with the input wastewater for dissolution or entrainment therein, without the use of pumps, compressors, blowers or the like which would need to be used if the input wastewater were to be delivered at a deep location within the body of water. This represents a significant energy saving, and a significant reduction in noise associated with operating such equipment (e.g. blower). The outlet jets are located at a position where they are readily accessible for cleaning and maintenance purposes, as opposed to deeply within a large tank of wastewater into which personnel and equipment needs to be submerged for such purposes. Moreover, the surface splashing of a delivery system located above the surface of the body of liquid, with its accompanying noise, mess and lack of control of air entrapment is avoided. Further, the energy involved in delivering the wastewater to such a location is minimal, requiring little more than gravity feed, as opposed to the heavy duty pumping required for delivery to a significant depth in a body of liquid.

In a preferred embodiment, baffle plates are provided around the delivery jet and at a level shortly below its opening, further to control the flow of liquid and any suspended solids within the body of liquid. These baffle plates are suitably inclined at an acute angle directed downwardly towards the input location. This assists in a movement of solids and liquids from the surface of the body of liquid near the input location, in a downward direction along with the liquid input. The circulating motion of the body of liquid and solids therein is thereby assisted, and accumulation of floatable solids at the surface is reduced. Similarly, the circulation developed in the body of liquid, involving travel of input liquid to the bottom, reduces or prevents settling of solids at the bottom of the body of liquid.

An important feature underlying the successful operation of further preferred embodiments of the present invention is entrained gas bubble size control. When a gas such as air is being supplied in order to conduct aerobic fermentation in the body of liquid, the gas is best provided along with the input liquid, and in the form of gas bubbles of a size such that they will circulate throughout substantially the whole volume of the body of liquid. In this way, oxygen is available at all locations in the body of liquid where the fermentable material encounters the bacteria, to lead to the most efficient fermentation. If the gas bubbles are too large, they will float to the surface too quickly, and will not circulate throughout the body of liquid. Supplying large quantities of air often generates larger air bubbles which will not have enough penetration depth into the body of liquid, and will not distribute properly. Minute gas bubbles, but large enough to be visible, which will circulate throughout the body of liquid, are most efficient. The present invention, in a preferred embodiment, provides for this, along with a simple means for controlling bubble size and for controlling the amount of gas, e.g. air, which is delivered in bubbles of optimum size, from zero supply for anaerobic fermentation, up through the whole useful range for anoxic and aerobic fermentation.

For this purpose, the wastewater jet input nozzle described above, for disposition a short distance below the surface, is associated with a fluid inlet means provided in close proximity so that gas such as air from the fluid inlet means becomes entrained, entrapped or dissolved in the wastewater flowing from the inlet nozzle. The fluid outlet means may be provided alongside the wastewater input jet, but preferably surrounds it. The adjustment of the size of the gap between the fluid outlet means and the wastewater input jet allows for adjustment of the gas bubble size. The gas bubbles may be further reduced in size by the shearing action of their impingement on the edge surfaces of the jets Preferably, the fluid outlet jet and the wastewater inlet jet are disposed one within the other, e.g. concentrically, and both terminate in downwardly extending frusto-conical outlets. Then adjustment of the gap size between them, for bubble size control, can readily be done by moving one telescopically relative to the other.

The present invention aims to provide optimum gas entrainment (not maximum) so as to achieve, in an energy efficient manner, optimum bubble size and gas transfer rates. Since the fluid entraining mechanism is controllable and can be isolated from ambient air, it allows oxygen containing fluid addition when the optimum air entrainment is exceeded. The present invention allows entraining not only oxygen containing fluids but other fluids that are suitable for the treatment of wastewater. Examples of such fluids comprise the following: activated sludge, raw wastewater, biosolids supernatant liquid, high purity oxygen gas, ozone gas, hydroxyl-radicals, hydrogen-peroxide, sodium-hypochlorite, chlorine gas, methanol, aluminum-sulfate, sodium-bisulfate and etc.

Embodiments of the present invention provide apparatus for the treatment of wastewater and biological nutrient removal in activated sludge systems to provide steady and adequate but not excessive mixing in a liquid reactor and effectively de-stratify one or both of solid and fluid layers that may also be contained in the liquid body, while independently alternating the entraining, dispersing and dissolving a fluid at atmospheric or higher pressure.

The present invention also provides, in preferred embodiments, a single apparatus and method to provide steady mixing in a liquid reactor regardless of the rate of fluid entrapment, and effectively de-stratify solids and fluid stratification layers that may be contained in the liquid body, especially floatable matter, while controlling the entraining of a fluid at atmospheric pressure, so that alternating process conditions can be accommodated in an energy efficient way by means of a single and universal equipment. For example, one embodiment of apparatus of the present invention may use an oxygen-containing gas (such as atmospheric air) as the fluid to be entrained. By controlling the rate of the gas entrainment the following process conditions can be alternately provided in the same reactor: when air is off then anaerobic conditions prevail, when air feed is at a minimum level then anoxic conditions prevail, when air feed is at an average level then aerobic conditions prevail, when air feed is at a maximum level (or alternatively feeding a high purity oxygen containing fluid) then oxic conditions prevail. This type of process flexibility facilitates a unique process application for biological nutrient removal in activated sludge systems. One embodiment of the apparatus of the present invention may be adapted to suit some existing pumping stations and use pumped liquid energy to mix and provide alternating conditions mentioned above, to produce an energy efficient process application.

As a result, the present invention can provide improved biological nutrient removal efficiency in activated sludge systems comprising MBR, MBBR, and IFAS systems. The advantages comprise: right and steady degree of agitation (eliminating adverse affects of excess agitation on biological removal efficiency), energy savings, less complexity for installation, process and operation flexibility, hassle-free maintenance (by using in-situ cleaning mechanisms and easy access to the critical equipment), and noise-mitigation (by eliminating any loud equipment such as air blowers).

BRIEF REFERENCE TO THE DRAWINGS

In the drawings, closely related figures have the same number but different suffixes.

FIG. 1 is a diagrammatic sectional view of a liquid-jet-means and liquid-jet-ejector-means illustrating two embodiments FIG. 1(a), and FIG. 1(b).

In the drawings, like reference numerals indicate like parts.

DETAILED DESCRIPTION

Figure 5:
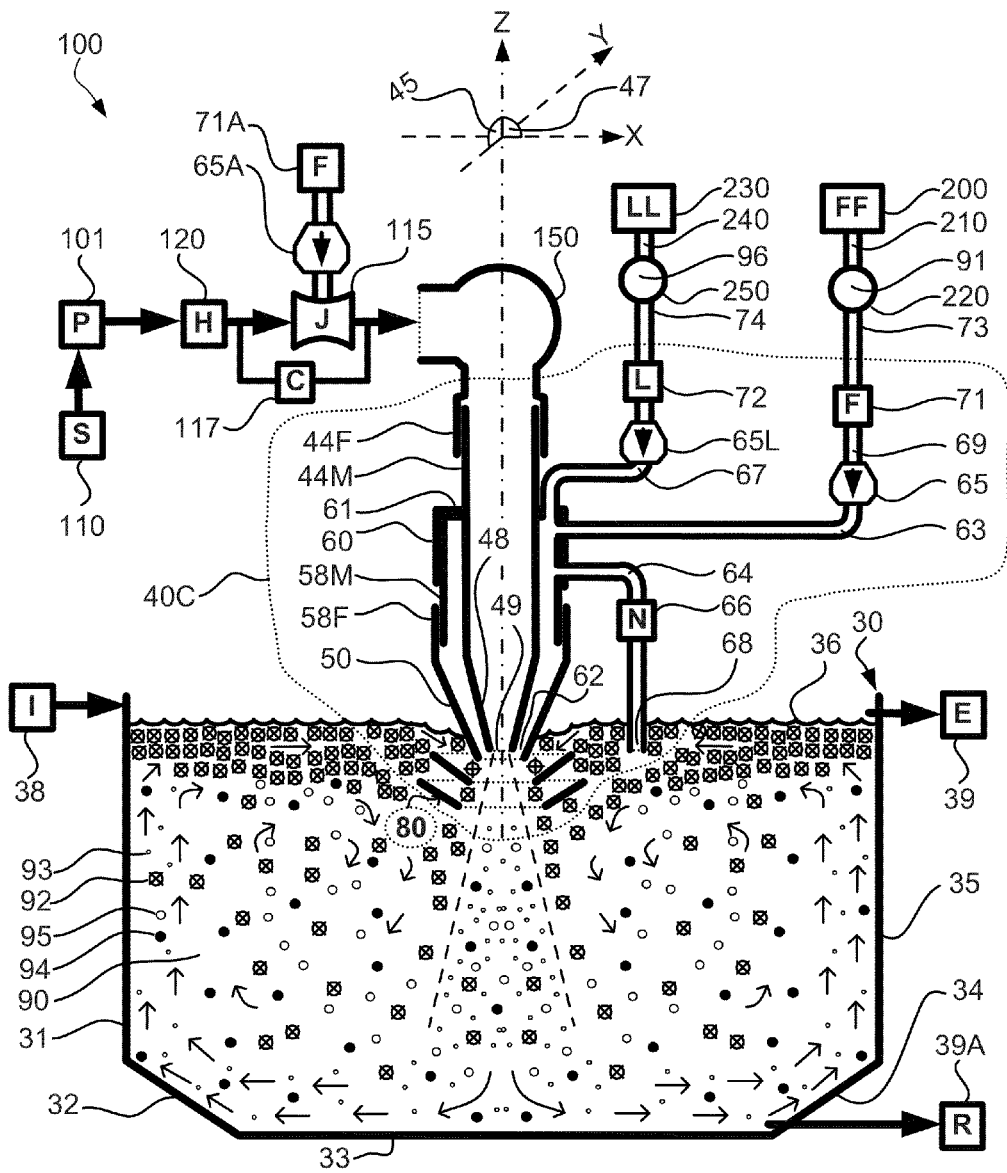
FIG. 5 is a diagrammatic sectional view of a preferred apparatus embodiment of the invention, with a bi-directional mixing pattern.

FIG. 1(a) is a diagrammatic view, in section, of the preferred embodiment of the liquid inlet jet means (liquid jet mixer) 40 of the invention, illustrating the principle of operation. The jet comprises a vertically downwardly extending pipe terminating at its lower extremity in a constricted liquid jet nozzle 48 (or liquid jet slot), the outlet 49 being adapted to be disposed a short distance 55 below the liquid surface 36 (FIG. 5). Below the outlet 49 is provided a baffle mechanism 80, comprising plurality of annular plates inclined at acute angles to the liquid surface 36, and angularly adjustable to provide appropriate flow patterns as the liquid from outlet 49 enters the body of liquid. Plurality of baffle plates 82, 86 making up the baffle mechanism 80 are attached to the lower portion of the liquid inlet jet means.

FIG. 1(b) is a similar illustration of another embodiment of liquid inlet jet means, 40A, in which the inlet line to the liquid nozzle 48 includes a fluid injection mechanism 115 in the form of a venturi, a fluid feeding control means 71A through which a fluid such as air (or methanol) can be controllably supplied to the wastewater and activated sludge liquid flowing to the liquid jet nozzle 48 via the venturi, and a control valve 117 on a flow by-pass line to effectively control fluid entraining.

Figure 2B:
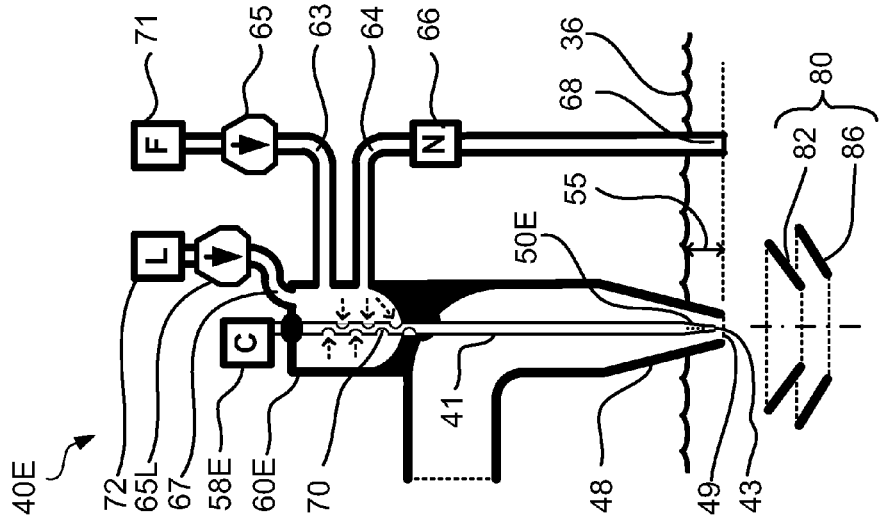
FIG. 2 is a diagrammatic sectional view of two further embodiments of liquid-jet-ejector-means according to the invention, FIG. 2(a) and FIG. 2(b)
Figure 2A:
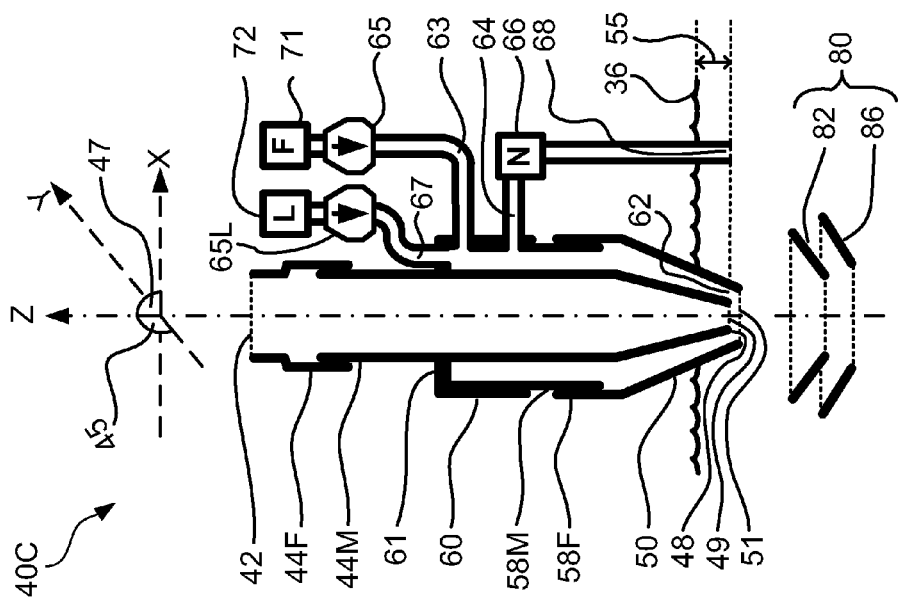

FIG. 2(a) and FIG. 2(b) are similar illustrations of further embodiments of liquid inlet jet means, but also including controllable fluid inlet means. The embodiment of FIG. 2(a) has a fluid inlet means in the form of a sleeve 60 surrounding the liquid jet nozzle 48 and separated to leave an annular space therebetween. The sleeve 60 also terminates at its lower extremity in a frusto-conical fluid inlet nozzle 50 (or a fluid inlet slot) and its outlet 51, leaving an annular gap 62 between the sleeve 60 and the liquid jet nozzle 48. By raising and lowering the fluid inlet nozzle 50 by use of inter-fitting screw threads 58M and 58F, the size of the gap 62 between the nozzles 48 and 50 can be adjusted. Upper extremity of liquid jet ejector 40C is also made telescopic by use of inter-fitting screw threads 44F and 44M, (FIG. 2(a) and FIG. 3), so that the submergence depth 55 into the liquid body can be adjusted. Two separate fluid inlets 63 and 67 are provided in sleeve 60, communicating with gap 62. Through inlet 63, fluid such as oxygen-containing fluid is supplied, under flow control of valve 71 and backflow prevention mechanism (a check valve) 65. This allows for controlled addition of air or the like to the incoming wastewater and activated sludge liquid, for controlled aerobic, oxic or anoxic fermentation. Through inlet means (a pipe) 67, liquid can be supplied under control of inlet control valve 72 and backflow prevention mechanism (a check valve) 65L. This serves as a means for introducing flushing and cleaning liquid to service the gap 62 and negative pressure reliving mechanism (64, 66, 68), or for addition of other liquids to assist the fermentation, or even as a supplementary, controlled inflow of additional wastewater or activated sludge.

FIG. 2(b) shows an alternative embodiment, in which the wastewater in the liquid jet nozzle 48 surrounds the fluid inlet nozzle 50E, which is in the form of a tube 41, terminating at its lower end in a frusto-conical tip. An upper chamber 60E communicates both with the tube 41 via holes 70 in the top-end and with liquid inlet 67 and fluid inlet 63, as previously described. In both embodiments a safety feature 66, 68 is provided to control negative pressures and prevent cavitation in sleeve 60 or liquid suck-back into the gap 62. In both embodiments also, it will be noted that the outlets 51, 49 project downwardly into the liquid body and terminate a short distance 55 below the surface.

Figure 3:
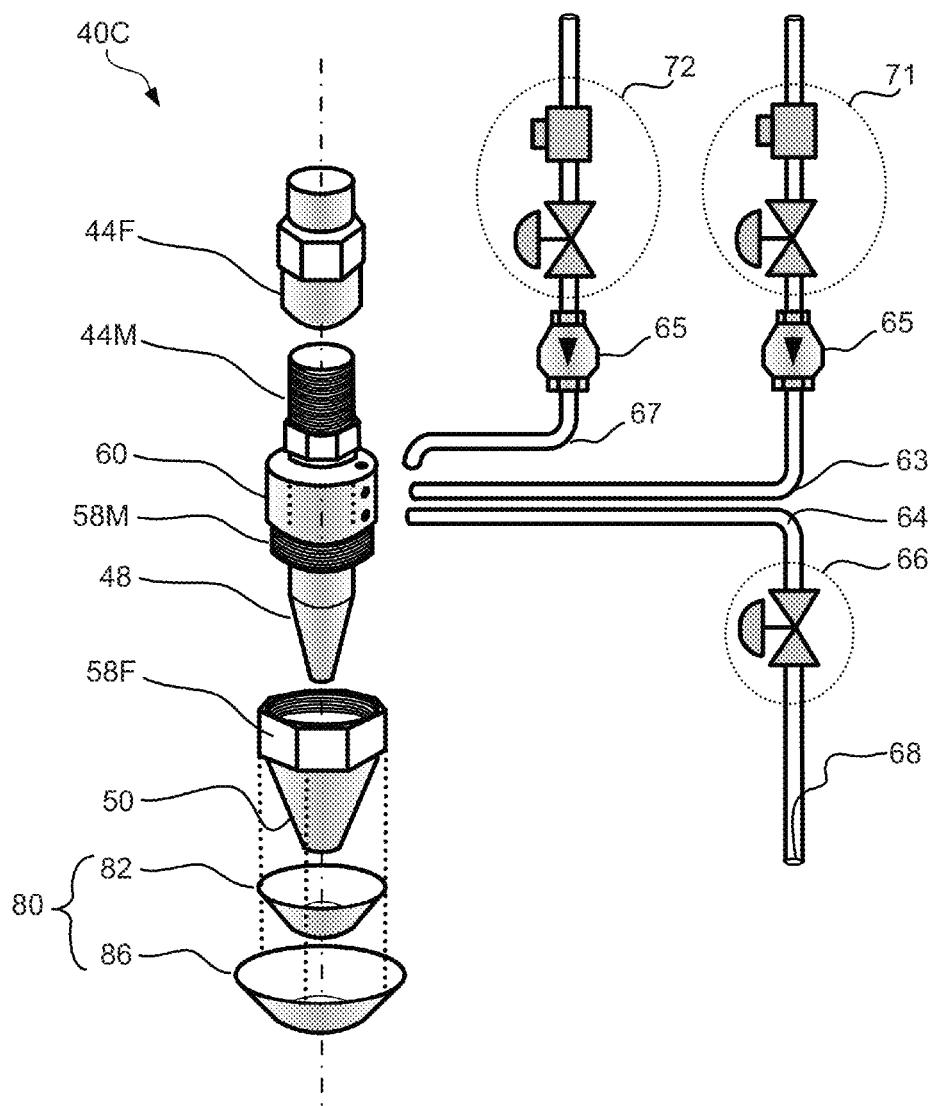
FIG. 3 is an exploded isometric view of the liquid-jet-ejector-means embodiment of FIG. 2(a)

FIG. 3 shows an exploded perspective of the FIG. 2(a) embodiment 40C, with like reference numerals indicating like parts. Relative vertical positioning of screw inter-fitting tubular elements 44F and 44M of the inner sleeve 60 provides for vertical, telescopic adjustment of the height of the outlet 49 from the sleeve.

By raising and lowering the fluid inlet nozzle 50 by use of inter-fitting screw threads 58M and 58F, the size of the gap 62 between the nozzles 48 and 50 can be adjusted. When a gas such as air is supplied through sleeve 60, the size of this gap and lower peripheral edges 49 and 51 largely control the bubble size of the gas entraining with the liquid issuing from liquid jet nozzle 48.

Figure 4:
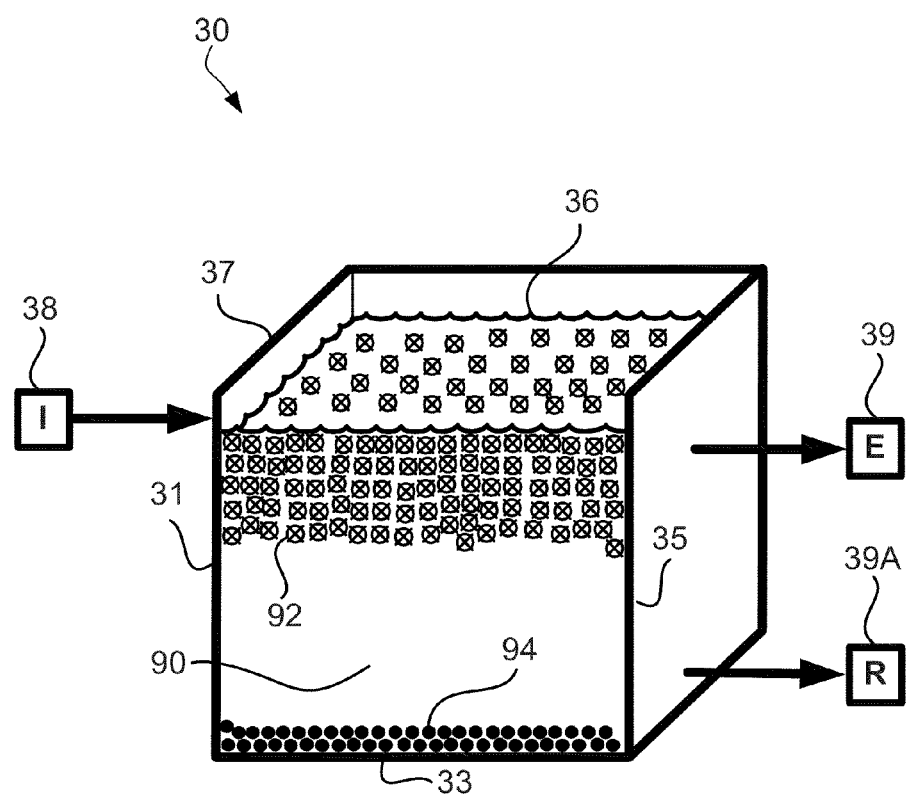
FIG. 4 is an isometric-view of a container as the liquid reactor to receive liquid jet means and liquid jet ejector means of FIGS. 1 to 3.

FIG. 4 diagrammatically illustrates a rectangular tank 30 of liquid 90 (wastewater and activated sludge as mixed-liquor) with side walls 31, 35, and containing solids, some of which 92 are floating and others 94 of which are settling. With no mixing or agitation in the tank 30, stratification results. This is undesirable, since in most instances the solids (especially the floating solids that are artificially added to improve process performance in MBBR and IFAS systems), have substantial amounts of the required fermentation bacteria adhered to them. These need to be distributed through the body of liquid for efficient fermentation. For an embodiment adapted to MBBR and IFAS systems, artificially added floatable solids will not be removed from the tank 30 via outlets 39 and 39A as the process is conducted continuously.

With reference to accompanying FIG. 5, a preferred embodiment of an apparatus according to the invention shows the container (tank) 30 as liquid reactor, with inlet liquid jet ejector 40C according to the embodiments previously described operating therein. A liquid-inlet-routing-control-means 110 (a valved intake or set of flow routing control valves as shown in FIG. 8) is adapted to draw liquid from a plurality of liquid containers (optionally including the container 30 as described below via outlet 39A at the bottom of container 30).

Figure 7:
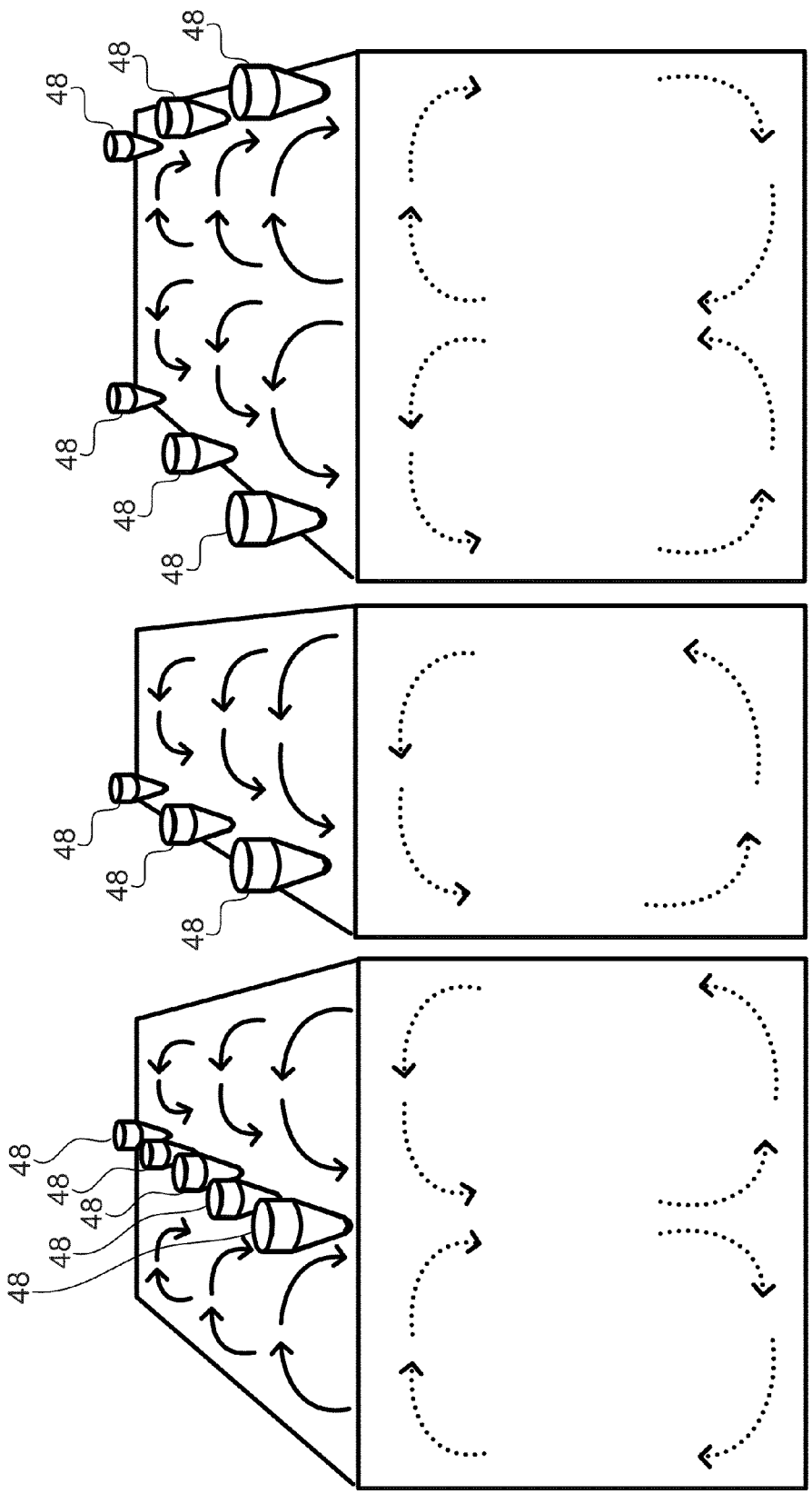
FIG. 7 is a diagrammatic isometric view of a set of rectangular reactors according to FIG. 4, illustrating different mixing patterns and liquid jet means arrangements.
Figure 8:
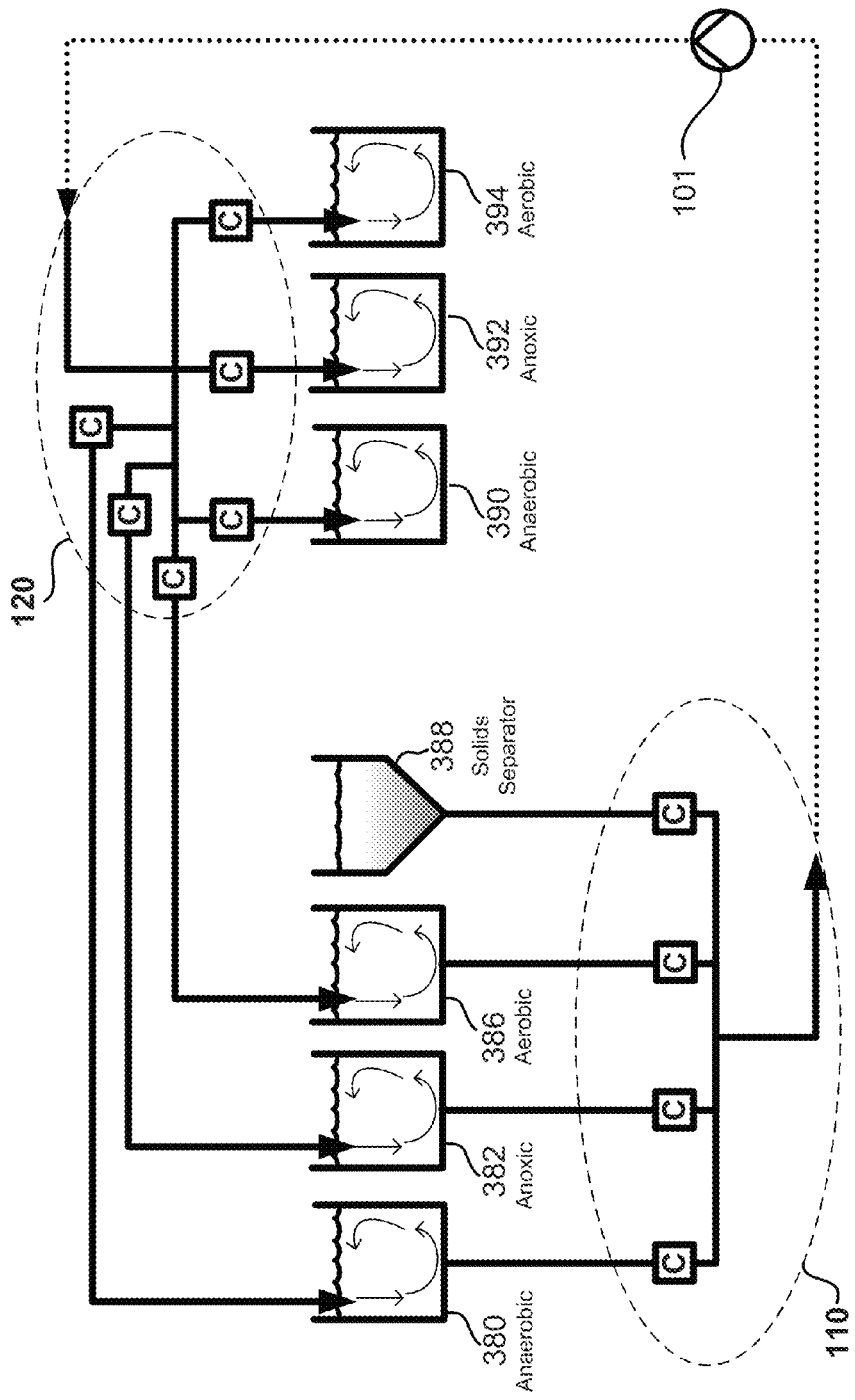
FIG. 8 is a diagrammatic view of a preferred liquid-inlet-routing-control-means and a liquid-transfer-routing-means according to FIG. 5, illustrating a an optional and complex arrangements.

A liquid-transfer-routing-control-means 120 (comprised of multi-port flow control valves for flow routing and interconnecting pipelines as shown in FIG. 8) connects to and is adapted to transfer liquid into a plurality of liquid containers, including the container 30, via a plurality of liquid jet nozzles 48 or liquid jet ejector 40C previously described, the jets being disposed just below the liquid surfaces 36 of the respective containers. This plurality of containers aspect is further described below, with reference to FIG. 7 to FIG. 11.

A liquid pump 101, connected to the liquid-inlet-routing-control-means 110 and the liquid-transfer-routing-control-means 120 transfers liquid from one to the other.

A fluid injection mechanism (e.g. venturi) 115 is connected to the liquid-transfer-routing-control-means 120 via branch piping to a back-flow preventing device (e.g. a check valve) 65A and a fluid entraining flow control means (e.g. a control valve and a solenoid valve) 71A (all off-the-shelf, conventional non-proprietary items), and a bypass-line with a flow control valve 117, and to a liquid distribution means 150 (e.g. a sparge bar or manifold). The manifold 150 communicates to a plurality of liquid jet ejector devices 40C that protrude vertically downwardly, terminating at their lower ends in a constricted liquid jet nozzle 48 with a lowermost throttled outlet 49, disposed a short distance below the surface 36 of the body of liquid 90 in the container 30.

The apparatus also includes a central fluid feeding system disposed generally above the container and comprising, connected in series by fluid delivery pipes, a central fluid feeding control means (e.g. a flow control panel comprising a valve and a flow monitoring device) 200, a fluid feeding header or manifold 220, a plurality of local fluid feeding control means (e.g. a valve) 71, and a back flow preventing device 65. This is normally used for supplying controlled amounts of oxygen containing fluid for aerobic fermentation, recycled activated sludge and nitrate-recycle for anoxic fermentation, methanol for anaerobic fermentation and any combination the above fluids to improve biological nutrient removal. A plurality of fluid output pipes 63 communicates with the interior of a plurality of depending annular sleeves 60, one for each liquid jet nozzle 48 (or liquid jet slot), arranged concentrically around the vertically downwardly protruding portion of liquid jet ejector 40C (FIG. 2(a)), to deliver fluid thereto. Sleeve 60 terminates at its lower end in the frusto-conical fluid inlet nozzle 50 described in connection with FIG. 2(a) and constituting a fluid entraining slot (or nozzle) and forming a fluid inlet means. The outlet from the sleeve 60 defines an adjustable contact gap 62 between the fluid inlet nozzle 50 formed by lower extremity portion 51 (FIG. 02(a)) and the throttled liquid outlet 49, and disposed at about the same level as, in fact slightly lower than, throttled outlet 49 of the liquid inlet means. The nozzles (or slots) 50 and 48 are custom designed for each application defining the liquid flowrate, degree of mixing energy and desired (optimum) fluid entraining rate (a optimum bubble size for gas feed). The gap 62 is adjustable by means of telescopic positioning mechanism (inter-fitting screw threads) 58F and 58M. The submergence depth 55 of the liquid nozzle throat 49 into the liquid body can also be adjusted by means of similar telescopic mechanism (inter-fitting screw threads) 44F and 44M, to generate small bubbles when a gas such as air is fed as the fluid, for the purpose of optimizing the amount of gas entrapping so that increasing gas transfer rate into the liquid (wastewater and activated sludge). There are at least 4 types of fluid entrapping control which can be used in embodiments of the invention: custom design liquid jet throat 49 and fluid outlet throat 51 of predetermined cross-sectional areas, a gap 62 adjustment mechanism such as an inter-fitting screw threads 58F and 58M; alternating the both cross-sectional area of throttled outlets 49 and 51 accommodated by means of a flexible spout (or slot) shape control mechanism; a local flow control valve comprised in control assembly 71; and a central flow control valve comprised in global flow control panel 200.

Also provided generally above the container 30 is a central liquid feeding system comprising a central control means (a control panel) 230, an interconnecting pipeline 240 and liquid feeding pipeline (header or manifold) 250. This also communicates with sleeve 60, via a local inlet control valve 72, a check valve 65L and a negative pressure prevention mechanism 66 adapted to relieve any excess negative pressure occurrence in tube 60 to prevent possible cavitation when fluid feeding controls 71 and 72 are both closed, all as described above with reference to FIG. 5. In the event of excess negative pressure, liquid (wastewater) is sucked from the container 30 by means of pipeline 68 through control means 66 (a valve) and connecting pipeline 64 into sleeve 60 and therefrom recycled back to the container 30 by means of gap 62.

Figure 10:
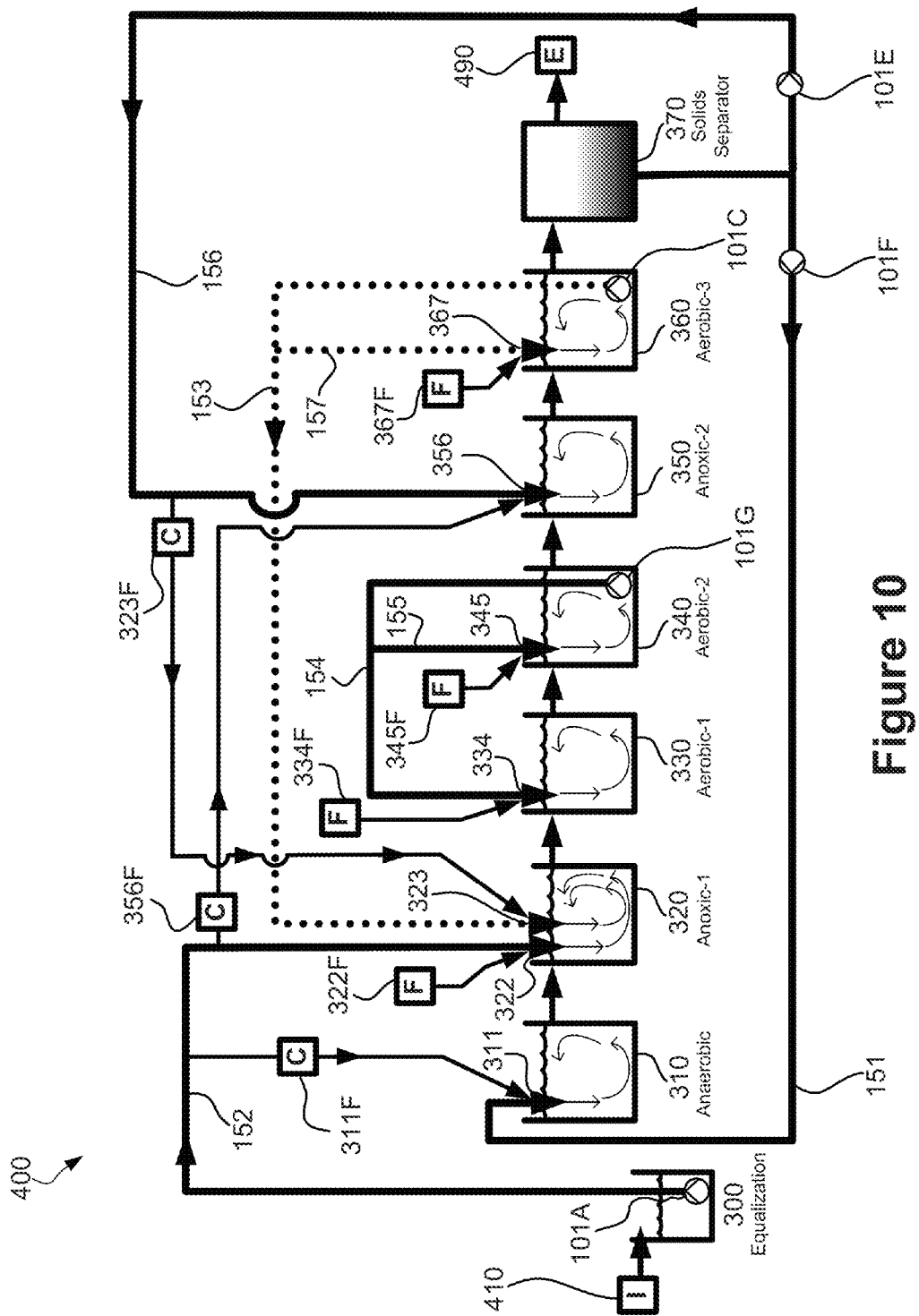
FIG. 10 is a diagrammatic view of a preferred embodiment of an overall process according to a preferred embodiment of the invention.
Figure 11:
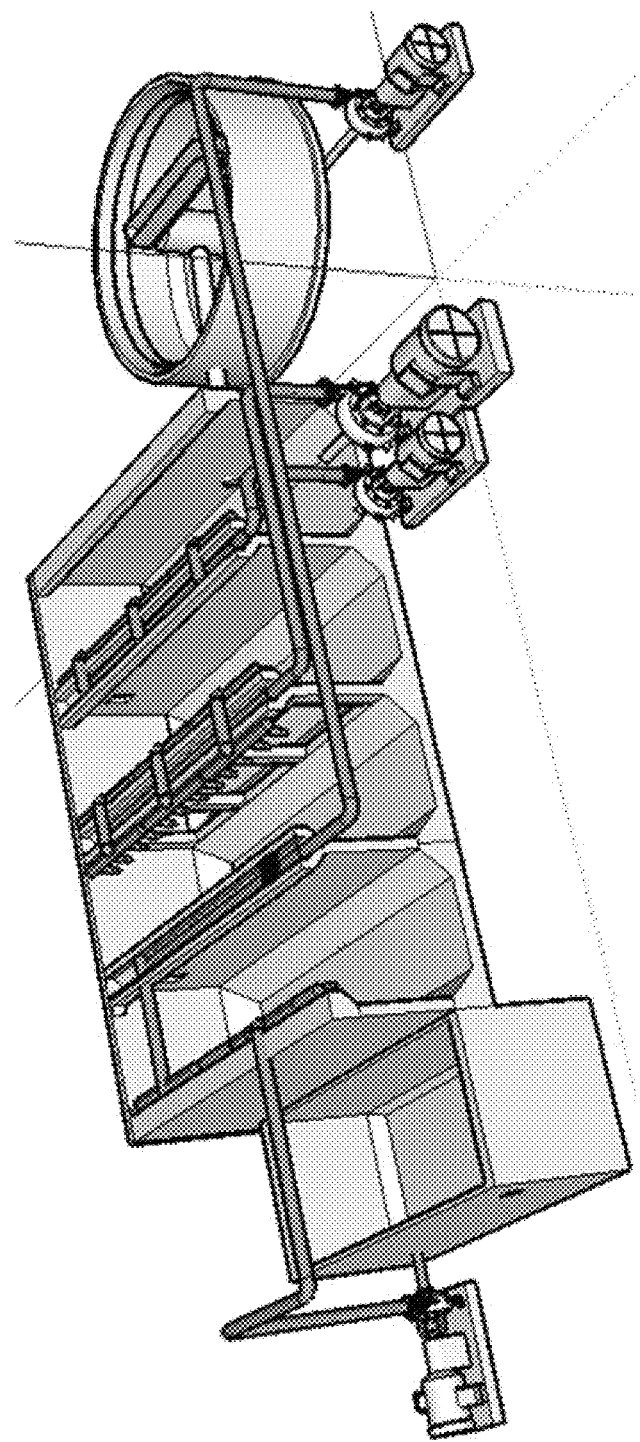
FIG. 11 is a perspective view, partially in section, of an apparatus for conducting preferred process embodiments of the invention.

The container 30 also includes an optional second influent mechanism 38 by which liquid is fed to the container 30, and two effluent mechanisms 39 and 39A, by which liquid can be removed from the container. The liquid pump 101 is adapted to draw liquid via a liquid-inlet-routing-control-means 110 and transfer liquid to the liquid-transfer-routing-control-means 120. The liquid-inlet-routing-control-means 110 (in the form of a valved intake) is provided with an optional inlet-routing-means (in the form of multi-port set of valves and depending pipelines, one embodiment shown in FIG. 8) adapted to draw liquid from plurality of liquid containers including the liquid reactor 30, to be mixed therein. The liquid-transfer-routing-control-means 120 (in the form of a valved discharge) with an optional outlet-routing-means (in the form of multi-port set of valves and depending pipelines, one embodiment shown in FIG. 8) is adapted to pump liquid into a plurality of liquid containers including said reactor 30, as illustrated in FIG. 7 and FIG. 10, by means of a plurality of flow distribution manifolds 150 which are adapted to distribute liquid into plurality of liquid jet mix ejectors 40C of the type illustrated in FIG. 2(a).

A further outlet pipe 64 leads from the tube 60, via a negative pressure preventing mechanism (e.g. control valve) 66, into the container 30, terminating at its lower end 68 at about the same level as outlet 49, but laterally offset therefrom. This serves to relieve excess negative pressure to prevent possible cavitation and back-flow into the sleeve 60 via gap 62, according to good engineering practice.

Figure 6:
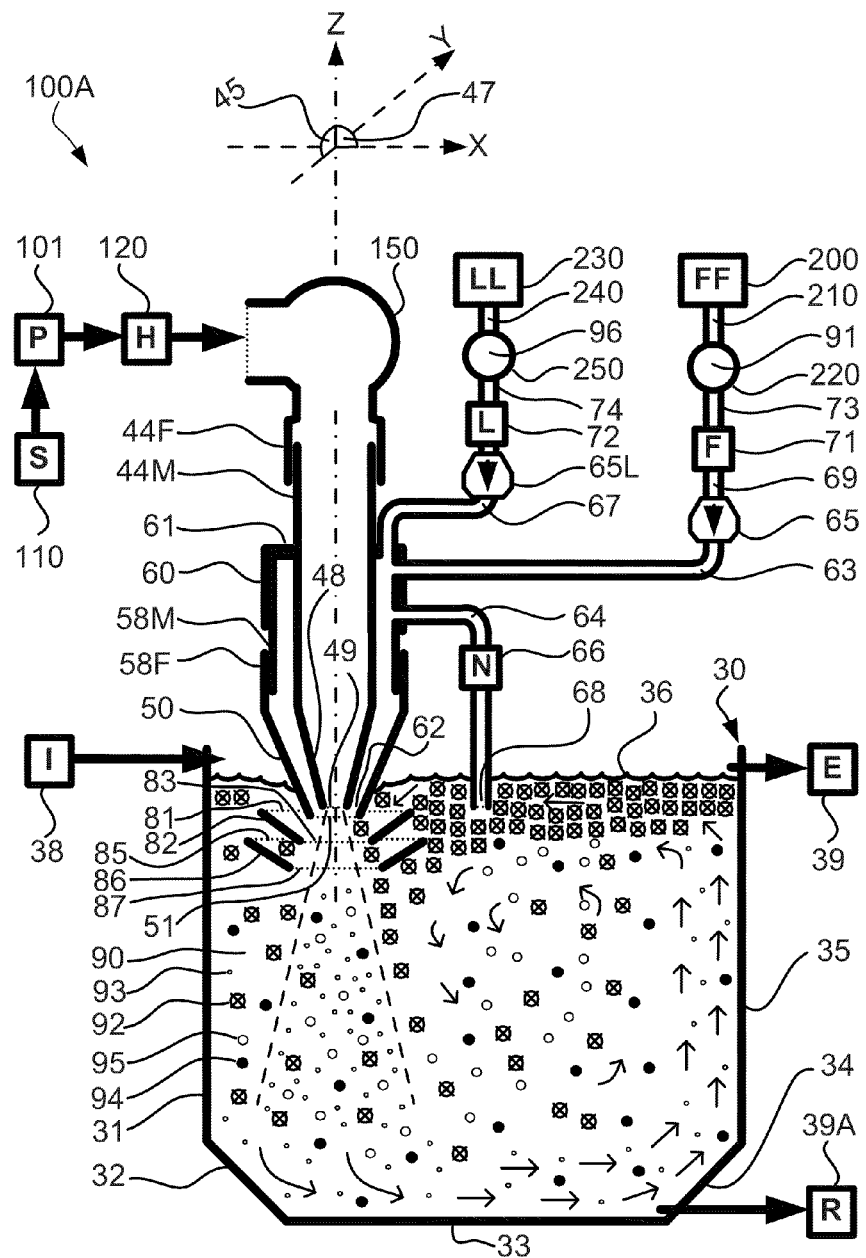
FIG. 6 is a section-view of a similar apparatus embodiment to that of FIG. 5, but with a unidirectional mixing pattern.

FIG. 6 illustrates an apparatus according to another embodiment of the invention. It is similar to FIG. 5, except that the plurality of liquid jet ejectors 40C are disposed to one side of the container 30 instead of centrally. All other apparatus items are essentially the same. The delivery of liquid to container 30 from each liquid jet nozzle 48 is still essentially vertically downward, at a location just below the liquid surface. Similar flow patterns are obtained, but to one side of the container only. Effective de-stratification is still achieved.

The liquid jet ejectors 40C and 40E (in FIG. 2) are adapted to mix a body of liquid 90 in the reactor 30 that may contain one or both of floatable matter such as floatable solids 92 and settleable matter such as settleable solids 94, effectively to de-stratify floatable-matter-layer by means of a floating-matter-routing-baffle-means (baffles) 80 and settleable-solids-layer in the body of liquid. This is achieved by vertically downward delivery of liquid just below the surface 36 of the body of liquid, so that the flow penetrates to the bottom 33 of the container 30 with a sufficient hydraulic force, resulting in homogeneous mixing throughout said reactor 30, while concomitantly achieving in-situ and controlled entraining, dispersing or dissolving of a fluid 91 in the body of said liquid 90.

The operation of the process of the present invention, using an apparatus such as that illustrated in FIG. 5 or FIG. 6, will be apparent from a consideration of the drawings. The liquid pump 101 transfers liquid such as wastewater at a desired liquid flow-rate and at a certain pressure, thereby providing a steady agitation rate to a body of liquid 90 contained in the reactor 30. The pumped liquid is fed through liquid-transfer-routing-control mechanism 120 and optional fluid injection mechanism "J" or 115 (in the form of a venturi) to sparge-bar-manifold 150 and distributed into evenly disposed liquid jet nozzles 48 exposing said liquid jet nozzles or liquid jet ejectors 40C to the body of said liquid 90 at a certain vertical submergence level 55 preferably just under the liquid surface 36 to provide constant mixing independently from entraining a fluid or gas, progressing substantially vertically downward into the body of liquid, and creating vertically plunging parallel trajectory jet streams on a line located adjacent to liquid surface 36, at the mid-point along the reactor width 36 (liquid surface and reactor width are represented by the same number: 36), parallel to side walls (31 or 35) and lining along the reactor length (37).

The fluid inlet nozzle 50 is adapted to each liquid jet nozzle 48 to accommodate controlled entraining, dispersing and dissolving a fluid 91 into the body of liquid 90. The contact-gap 62 between liquid jet nozzle 48 and fluid inlet nozzle 50 is adjusted to control—especially for gas entraining—the rate-of-gas-flow and gas bubble size for optimizing gas dissolution and transfer rate.

The optional fluid injection venturi 115 is adapted to accommodate controlled entraining, dispersing or dissolving a fluid into body of liquid by means of a control valve 117 on by a pass pipeline. This optional fluid injection means 115 is used as an alternative fluid inlet for further improvement especially in gas dissolution and gas transfer rates into the body of liquid.

The kinetic energy of each individual vertically plunging liquid jet (dependent on cross-section 49) is adjusted to penetrate a certain thickness of floatable solids layer at the liquid surface 36 and to entrain the floatable solids 92 into the plunging jet stream by means of assistance from the baffle mechanism 80; the mixture of liquid-solid-gas-fluid is then carried downwards, to reach the reactor bottom with an adequate energy to keep settleable solids also in suspension. The flowing mixture then diverges into two, and produces bi-directional streams along the reactor bottom across to the each side walls 31 and 35 (FIG. 5). Then the streams move upwards along the side walls 31 and 35 and reach the liquid surface 36. Then the streams move along the surface 36 pushing the floatable solids 94 towards the plurality of liquid jet ejectors 40C induction area and finally to converge at the mid point where liquid jet-mix-ejectors are located, thus completing a full cycle. When the body of liquid comprises artificially added floatable solids 92 (such as in MBBR and IFAS systems), the liquid jets are designed to provide adequate kinetic energy to carry some of the floatable solids vertically downwardly to and along the bottom portion of the container 30, with subsequent upward movement of the floatable solids to contribute to the liquid mixing pattern and efficiency. Minimizing the kinetic energy provided by liquid jets and taking advantage of floating solids to contribute subsequently upward liquid mixing pattern will significantly reduce energy utilization.

The present invention of apparatus in FIG. 5 is shown as including a single inlet liquid jet mixer 40 arrangement (FIG. 1), but it can readily be adapted to include a plurality thereof, all feeding into a single container 30 or into a plurality of such containers. FIG. 7 of the accompanying drawings illustrates three embodiments in which several inlet jet means feed into a single container 30. In FIG. 7(a), the arrangement is as shown in more detail in FIG. 5, with the inlet jets located centrally in the container and creating circular flow patterns in two sides of the container. In FIG. 7(b), the arrangement is as shown in detail in FIG. 6, with the liquid jet nozzles 48 (as a portion of 40 or 40C) at one side and creating a single circulation system in the container. In FIG. 7(c), two sets of liquid jet nozzles 48 are provided at opposed sides of the container 30, creating a flow pattern similar to that of the FIG. 7(a) arrangement, but in the reverse directions.

FIG. 8 of the accompanying drawings diagrammatically illustrates one interconnecting arrangement of a plurality of apparatus as described in FIG. 5. This shows in more detail the liquid-inlet-routing-control-means 110, which is in the form of interconnecting pipeline associated controls "C", each feeding liquid from selectively one (or more) of set of containers, e.g. anaerobic container 380, anoxic container 382, aerobic container 386, and solids separator 388, by means of pump 101, to the liquid-transfer-routing-control-means 120. This provides far feed or recycle of liquid to an additional set of containers e.g. anaerobic container 390, anoxic container 392, aerobic container 394. Also transferring from liquid-transfer-routing-control-means 120 back to containers 380, 382, and 386 can be arranged. All containers are equipped with inlet arrangements such as liquid jet mixer 40 or liquid jet ejector 40A, 40C, or 40E as previously described.

Figure 9:
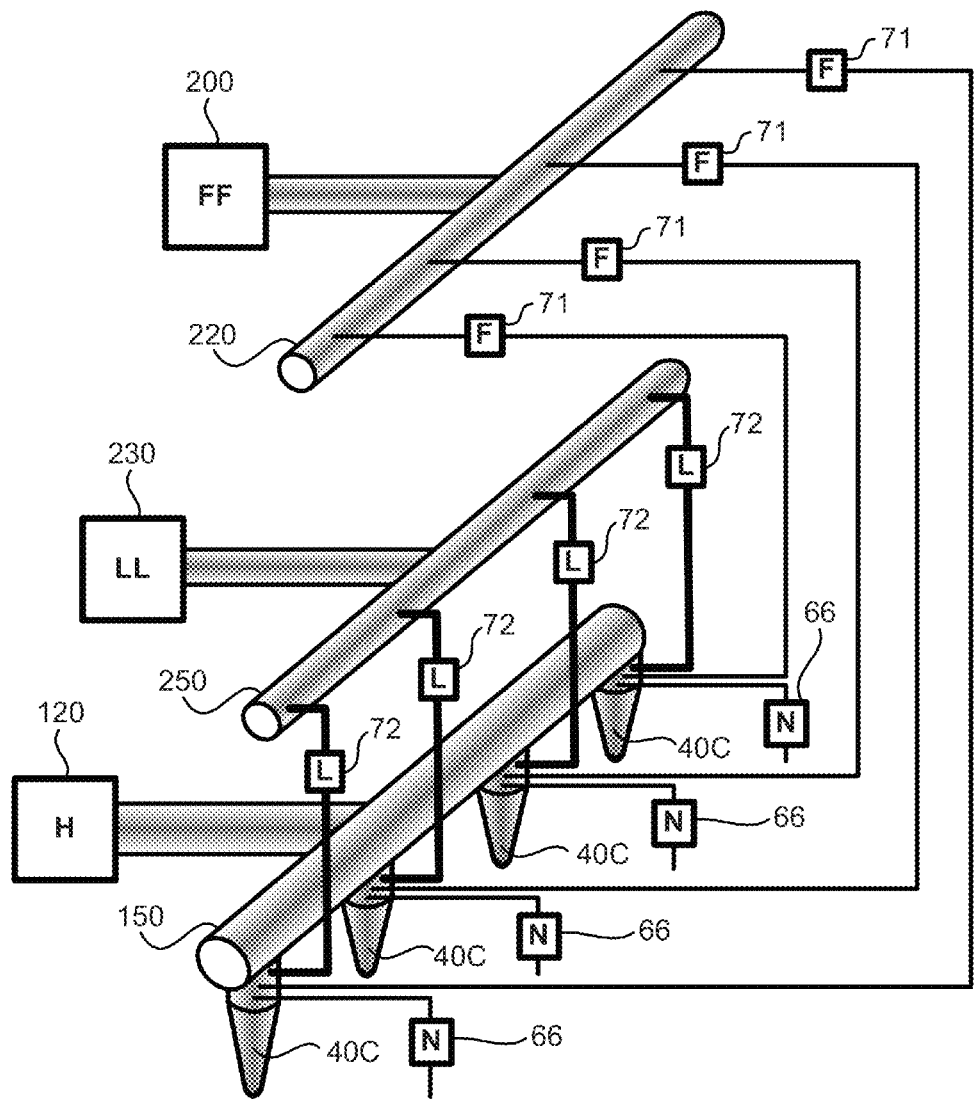
FIG. 9 is a diagrammatic view of one interconnection system of an apparatus according to an embodiment of the invention.

For these and similar arrangements, a fluid-feeding-system comprising one or more fluid-flow-control-mechanisms 200 can be adopted, feeding to a manifold 220 with several separate pipelines and valves 71 feeding to different liquid jet ejectors 40C, as diagrammatically illustrated in FIG. 9. Also included are the liquid inlet system 230 for the cleaning, flushing and optional chemical addition, and the liquid-transfer-routing-control-means 120 for the inlet of wastewater or activated sludge, as described in FIG. 6. Each feeds a respective manifold and thence to the different liquid jet ejector 40C. Local liquid and fluid feeding control systems 71 and 72 can be eliminated for small systems where individual liquid-jet-ejector 40C flow adjustment is not critical and required.

For one embodiment of the present invention of apparatus 100 as illustrated in FIG. 5, liquid jet mix ejector 40C (in FIG. 2(a)) direction is substantially vertically downward, with an essential angle of 90° with horizontal XY-plane represented by liquid surface 36. In other words it is essentially vertical to both horizontal X-axes and horizontal Y-axes and those angles depicted by angles 45 and 47 in FIG. 5. Suitable jet penetration angles range between 81° to 99° degrees with respect to horizontal-Y-axis (angle 45) and also make an optional angle range between 81° to 99° degrees with respect to horizontal-X-axis (angle 47), resulting in optional ±10% deviation from 90°-degree-vertical-line to the XY-horizontal-plane which represents quiescent liquid surface 36.

Liquid jet nozzle (48) exposure in to the body of said liquid (90) is a certain vertical submergence level (55) with a general range of 0.001 meter to 1.0 meter, further ranging from 0.04 meter to 0.30 meter, preferably 0.06 meter to 0.15 meter from the surface.

The degree of hydraulic force created by the liquid jet nozzles (48) are dependent of Reynolds Number, "Re" (a dimensionless fluid flow measure defined as the ratio of dynamic pressure and shearing stress) with a general range between 16,000 and 90,000 (observed during model study for the present invention) however, calculated general range for actual size embodiment "Re" is between 100,000 and 500,000. It will be noted that, there is no optimum "Re" or hydraulic agitation energy per unit volume for all scenarios. Optimum "Re" is calculated by considering many design factors such as tank dimensions (depth, width, shape), characteristics of body of liquid to be agitated, required amounts of fluid (or gas) to be entrained, percent solids content and other key characteristics of the body of liquid. Therefore, for specific cases the present invention can be designed to have lower or higher "Re" as disclosed above. The higher "Re" the less energy-efficiency, so the object is to aim low "Re" values as possible but high enough "Re" values accommodating the required adequate agitation and fluid entraining. The liquid jet nozzle (48) jet also has a preferred "mean cross-sectional velocity" with a general range tested during the model study between 5.0 m/second and 24 m/second. Again, the higher the jet velocity the less the energy-efficiency, so the object is to aim low velocities as possible, but high enough to provide adequate agitation and fluid entraining requirement for an individual case.

Liquid-inlet-routing-control-means has an optional routing-control-means (110) comprising a plurality of pipelines, valves, open/close control mechanisms, and screens (one embodiment shown in FIG. 8).

Liquid-transfer-routing-control-means (120) has an optional routing control mechanism comprising a plurality of pipelines, valves, open/close control mechanisms, pressure and temperature monitoring devices (one embodiment shown in FIG. 8).

The liquid-jet-ejector (40C), liquid-jet-nozzle (48) and fluid-inlet-nozzle(s) (50, 50A) have cross-sectional shape preferably circular or oval, alternatively a custom designed geometric shape where a custom designed spout is made up of a flexible material to alternate its cross-sectional shape and area to control fluid entraining rate and gas bubble size created.

A preferred container for a most energy efficient embodiment of the present invention is custom designed for individual cases. As a rule of thumb, the container can be hydraulically idealized by custom Width (W)-Length (L)-Height (H) ratios to provide ideal hydraulic conditions for substantially vertical downward (tumbling) mixing, where those are defined as ratio H/W is between 1 and 3 and the ratio of L/H between 1 to 10. It will be noted that the present invention will be suited to work in existing containers with a higher or lower H/W and L/H ratios than provided above with a potential less energy-efficient means.

The operation of a preferred embodiment of the process of the invention will now be described with reference to FIG. 10. A process for the treatment of wastewater and biological nutrient removal, in particularly for integrated fixed-film activated sludge system uses a plurality of the apparatus described above, as universal equipment to provide adequate mixing required in a set of reactors 310, 320, 330, 340, 350, and 360, followed by a downstream solids separator 370. In each of the reactors, desired process conditions such as anaerobic, anoxic, aerobic and oxic (advanced oxidation) can be concomitantly arranged while agitation is being provided. Alternatively the conditions can be varied or alternated in one reactor. As depicted in FIG. 10, the process includes a first step of introducing raw wastewater to an equalization tank or container 300. The raw wastewater is drawn from the equalization tank or container 300 via pipeline 152, and transferred into an anoxic reactor 320 or alternatively into an anaerobic reactor 310 under control of liquid-flow-control-mechanism (valve) 311F. The energy of the pumped liquid is used for the mixing in the anoxic reactor 320 while concomitantly-controlling the entraining (by means of flow control system 322F), dispersing and dissolving of air at atmospheric pressure or alternatively another fluid such as methanol as required for process, using the previously described jets 40 to maintain desired anoxic conditions in said reactor 320. Delivery of liquid in each case is substantially vertically downwardly, at a location just below the liquid surface as previously described, optionally but preferably using baffle plates to create the desired flow patterns.

In one method, activated sludge is drawn from the underflow of a solid-separation unit 370 located downstream of the reactors 320, etc., and transferred into an anaerobic reactor 310 upstream of the aforementioned anoxic reactor 320, and into another anoxic reactor 350 located upstream of an aerobic reactor 360. Again, the pumped liquid energy is used for the mixing in the reactors 310 and 350, while concomitantly-controlled-entraining or feeding of raw wastewater from the pipeline 152 is effected by means of liquid-flow-control-mechanisms 311F and 356F into the corresponding liquid jet mix apparatuses 311, 356, which are liquid jet ejectors 40C as previously described.

Activated sludge mixed-liquor may be drawn from an aerobic reactor 360 or 340 in which nitrification (biological oxidation of ammonia to nitrate and nitrite using specialized bacteria) taking place, and recycling into a preceding anoxic reactor 320 or alternatively into a preceding anaerobic reactor 310 (not shown for the embodiment in FIG. 10) for denitrification (biological reduction of nitrate and nitrite to nitrogen gas). Again, the pumped liquid energy is preferably used for the mixing in the respective anoxic or anaerobic reactor 320 or 310, further reducing energy consumption. At the same time, concomitantly-controlled-entraining and dispersing of returned activated sludge from a header or pipeline 151 or 156 is effected by means of a sludge-flow-control-mechanism 323F into a mixing apparatus 323 involving a jet of the type 40C previously described.

In another method according to the embodiments of the invention, activated sludge mixed-liquor is drawn from an aerobic reactor 340 and transferred to an upstream aerobic reactor 330, again using the pumped liquid energy for the mixing while concomitantly-controlled-entraining dispersing and dissolving of an oxygen containing fluid (such as air, oxygen gas, or hydrogen-peroxide) is effected to maintain desired aerobic conditions in the aerobic reactor 330 for mixing and aeration. Recycling of activated sludge mixed-liquor from a nitrifying reactor to an upstream aerobic reactor facilitates more robust nitrifiying bacteria culture throughout the disclosed process of invention.

In another method in accordance with the invention, activated sludge mixed-liquor is drawn from an aerobic reactor 340, 360 and recycled to the same aerobic reactor 340, 360, using the pumped liquid energy for mixing while concomitantly-controlled-entraining dispersing and dissolving of an oxygen containing fluid (such as air, oxygen gas, or hydrogen-peroxide) is conducted to maintain desired aerobic conditions in said aerobic reactor 340, 360.

Embodiments of the present invention provide a mixing apparatus with a capability of entraining, dispersing and dissolving fluids that may be necessary for the activated sludge system and biological nutrient removal.

When the present invention is incorporated to entrain an oxygen containing fluid, it serves as aeration equipment; therefore it provides a system in which the degree of mixing and degree of aeration are not dependent each other.

The present invention incorporates an immersed-plunging liquid jet which does not entrain ambient air due to surface impingement. On the contrary, the vertical jet is deliberately created just under liquid surface to provide steady mixing energy to the liquid body and concomitantly but independently from the rate of mixing accommodating in-situ and controllable entraining, dispersing and dissolving a fluid (such as atmospheric air) in the body of liquid contained in a reactor. Submersed jets do not create any significant surface impingement and therefore cause less likely foam problems associated with. The degree of mixing provided by the liquid jet is kept relatively constant, while entrained rate of fluid (air) is independently adjustable from zero to a maximum value to meet desired conditions and optimum bubble size for improved gas transfer and dissolution efficiency. Fluid (air) entrainment can be turned off completely to provide mixing only for anaerobic and anoxic reactors.

One embodiment of this invention not only incorporates steady mixing versus independently variable aeration in one apparatus, but also facilitates energy efficient biological nutrient removal in activated sludge systems and its improved versions (often called hybrid systems such as MBR, MBBR and IFAS).

The invention incorporates a vertically plunging jet created just under the liquid surface in order to have a steady mixing concomitantly but independently achieving in-situ and controllable entraining, dispersing and dissolving of not only atmospheric air but any other fluids that may be necessary for the process.

One embodiment of this invention has been adapted so that no major equipment, device, or pipeline has to be totally submerged into a reactor to do either or both of mix and aerate. All equipment can be located outside of the liquid reactor, except the plurality of liquid-jet-ejectors 40C that need to be semi-submerged or just submersed under the liquid surface to provide in-situ-controllable fluid entrainment including atmospheric air. The liquid-jet-ejectors are located at a very convenient distance from the liquid surface so that, in case of a potential clogging occurrence, they can easily be inspected and cleaned without stopping the operation. If an ejector ever needs to be serviced outside for maintenance, then it can be retrieved individually while the remaining ejectors that are unplugged can keep running.

The apparatus of the present invention comprises well known components such as pumps, pipelines, manifolds, valves, fluid-control systems etc. that can be easily mastered by any ordinary operation technician. There is no major proprietary equipment other than the custom designed jet-ejectors which can be cost effectively stored as spare parts. The design of the jet-mixing-apparatus may be complicated for some cases; however, the final product is relatively simple, energy-efficient and user friendly to operate and maintain, and significantly less noisy compared to air compressors or blowers.

Desired air bubbles size (93 in FIG. 5) is created by means of plurality of concentric frusto-conical nozzle arrangement (such as in 40C) and the control surface at the gap 62 between the nozzles 48 and 50.

I claim:

1. Apparatus for stirring a body of wastewater or mixed liquor in a tank, wherein:
   the apparatus includes a liquid-inlet, for conveying liquid to be treated into the tank, and includes a liquid-outlet, for conveying treated liquid out of the tank;
   the body of liquid includes floatable solids and settleable solids;
   the apparatus includes a liquid delivery pipe, and a powered pump for pressurizing and conveying a flow of liquid along the pipe;
   a downstream-end of the pipe is formed with a nozzle or other ejector;
   the apparatus is arranged so that the pressurized liquid emerges through the ejector as a nozzle-jet, and enters the body of liquid in the tank;
   the nozzle-jet is powerful enough, in relation to the tank, to establish a circulation-stream of the body of liquid in the tank, including:
   (a) to establish a nozzle-jet stream, which plunges down from the ejector towards the floor of the tank, carrying with it an entrainment of floatable solids from the liquid surface, and which reaches the floor with enough power to agitate, and to entrain, the settleable solids into the circulation stream, thereby creating a down-to-the-floor-stream component of the circulation-stream;
   (b) to continue the circulation-stream then outwards with respect to the ejector, along the floor of the tank, thereby creating an out-across-the-floor-stream component of the circulation-stream;
   (c) to continue the circulation-stream then upwards, towards the surface, thereby creating an up-towards-the-surface-stream component of the circulation-stream;
   (d) to continue the circulation-stream then inwards along the surface, towards the ejector, thereby creating an in-across-the-surface-towards-the-nozzle-stream component of the circulation-stream;
   (e) to keep the liquid moving continuously in the circulation-stream, being a steady continuing circulation and recirculation around the tank;
   (f) to ensure that substantially the whole body of liquid in the tank, and substantially all the floatable and settleable solids, are included in, and carried around with, the circulation-stream; and
   (g) to establish the said circulation-stream substantially entirely from the power of the nozzle-jet, without the need for assistance from a powered mechanical flow-creator located below the surface of the body of water; and
   the tank is so dimensioned and configured as to contain and promote the circulation-stream established by the ejector.

2. Apparatus of claim 1, wherein:
   the ejector is submerged at a submergence-depth below the surface of the body of liquid in the tank;
   the submergence-depth is so small that:
   (a) surface-water adjacent to the ejector is significantly affected by the power of the nozzle-jet, in that adjacent surface-water is drawn into, and becomes entrained in, the down-to-the-floor-stream; and
   (b) the drawing-in of the adjacent surface-water into the down-to-the-floor-stream significantly assists in creating the in-across-the-surface-towards-the-nozzle-stream;
   whereby the power of the nozzle-jet creates the circulation-stream, both directly by the down-velocity of the nozzle-jet, and also indirectly by the drawing-in and entrainment of the adjacent surface-water;
   the submergence-depth is so large that the significant entrainment of the surface-water takes place substantially without splashing or entrainment of air from above the surface.

3. Apparatus of claim 2, wherein the submergence-depth is between one millimeter and one meter from the surface.

4. Apparatus of claim 1, wherein:
   the energy of the nozzle-jet is powerful enough to draw surface-liquid, together with floatable solids in the surface-liquid, into the nozzle-jet to form the down-to-the-floor stream;
   whereby the solids are carried down to the floor and becoming entrained in the circulation stream;
   the apparatus includes baffle-plates, which serve to enhance the extent to which the floatable solids are carried down to the floor;
   the baffle-plates are:
   (a) placed below the liquid surface, surrounding the nozzle;

(b) inclined downwardly at an acute angle to the surface of the body of liquid;
(c) so placed as not to interfere with or inhibit the nozzle-jet;
(d) so configured as to receive the in-drawn surface-liquid, and the floatable solids entrained therein, and to direct the solids directly into the path of the nozzle jet.

5. Apparatus of claim 1, wherein:
the apparatus includes a fluid-pipe, having a downstream outlet, for delivering treatment fluid;
the fluid-pipe outlet is so arranged relative to the ejector as to mix the delivered fluid with the nozzle-jet of liquid, to such extent that the treatment-fluid, too, plunges to the floor of the tank, and becomes a component of the circulation-stream.

6. Apparatus of claim 5, wherein:
the fluid-pipe outlet delivers treatment fluid into the liquid delivery pipe, upstream of the ejector;
whereby the treatment fluid is introduced into the liquid being conveyed in the liquid delivery pipe, prior to the liquid emerging from the ejector.

7. Apparatus of claim 5, wherein, of the fluid-pipe outlet and the ejector, one is arranged as an annulus surrounding the other.

8. Apparatus of claim 5, wherein:
the treatment-fluid enters the liquid stream as bubbles of gas;
the nozzle-jet is powerful enough to carry the gas bubbles down to, and along, the floor;
whereby the gas bubbles are included in, and carried around with, the circulation-stream.

9. Apparatus of claim 5, wherein the treatment fluid is one or more of:
a gas;
a liquid;
a mixture of a gas and a liquid;
a liquid in which solid particles of treatment material are suspended.

10. Apparatus of claim 5, wherein:
the fluid in the fluid-pipe contains oxygen;
the apparatus has the capability:
(a) to enable operational control of the amount of oxygen entering the nozzle-jet stream;
(b) and thereby to control the level of oxygen in the circulation-stream in the tank to a level within the following range:
   (i) from a zero oxygen level, creating anaerobic treatment conditions in the tank;
   (ii) through a minimum oxygen level, creating anoxic treatment conditions in the tank;
   (iii) through an average oxygen level, creating aerobic treatment conditions in the tank;
   (iv) to a maximum oxygen level, creating oxic treatment conditions in the tank.

11. Apparatus of claim 10, wherein the apparatus has the capability to enable the oxygen level to be set to a first one of the levels, and then, after a period of time, to be set to a second one of the levels.

12. Apparatus of claim 1, wherein:
the liquid-inlet for delivering untreated liquid into the tank is the said liquid delivery pipe;
whereby the untreated liquid enters the tank through the ejector.

13. Apparatus of claim 1, wherein:
the apparatus includes added floatable solids, being solids that have been added into the liquid in the tank, in addition to solids naturally present in the liquid;
the added solids are of such structure as to have the capability:
(a) upon being subjected to the nozzle-jet, to be carried down to the floor of the tank;
(b) to become entrained in the down-to-the-floor stream, and to become a component of the circulation-stream; and
(c) to reduce the requirement for power in the nozzle-jet, in order to establish the circulation-stream.

14. Apparatus of claim 1, wherein:
the apparatus includes a second ejector;
both ejectors act upon a common body of liquid within the same tank;
the second ejector creates a second circulation-stream within the tank, having a second up-to-the-surface-stream and a second in-across-the-surface-towards-the-nozzle-stream;
the two ejectors are so positioned in the tank that the two circulation-streams come together and interact in the following manner:
(a) the said up-to-the-surface-component-stream combines with the second up-to-the-surface-stream, to create one single combined up-to-the-surface-stream; and
(b) that single combined up-to-the-surface-stream, upon reaching the surface, then separates and divides into (i) the said in-across-the-surface-towards-the-nozzle-stream component of the said circulation-stream, and (ii) the second in-across-the-surface-towards-the-nozzle-stream component of the second-circulation-stream;
the tank is so dimensioned and configured as:
(a) to contain and promote the two circulation-streams created by the two ejectors; and
(b) to ensure that substantially the whole common body of liquid in the tank, and substantially all the floatable and settleable solids, are included in, and carried around with, the two circulation-streams.

15. A liquid-treatment station, comprising apparatuses-A1, -A2, with respective tanks-T1, -T2, each of which embodies claim 5, wherein:
the station includes liquid-pipework, for transferring liquid between the tanks and apparatuses;
the liquid-pipework includes liquid-pumps and liquid-valves as appropriate for controlling such transfer;
the station includes fluid-pipework, for feeding treatment-fluid to the apparatuses;
the station includes appropriate fluid-controls, as appropriate for controlling the feeding of treatment-fluids to the apparatuses and for coordinating the feeding of the fluids with the transfers of liquids, including fluid-control-F1 and fluid-control-F2;
in respect of the apparatus-A1, the fluid-control-F1 is arranged to create anaerobic treatment conditions in the liquid in the tank-T1; and
in respect of the apparatus-A2, the fluid-control-F2 is arranged to create aerobic treatment conditions in the liquid in the tank-T2.

16. Apparatus of claim 2, wherein:
the energy of the nozzle-jet is powerful enough to draw surface-liquid, together with floatable solids in the surface-liquid, into the nozzle-jet to form the down-to-the-floor stream;
whereby the solids are carried down to the floor and becoming entrained in the circulation stream;
the apparatus includes baffle-plates, which serve to enhance the extent to which the floatable solids are carried down to the floor;

the baffle-plates are:
(a) placed below the liquid surface, surrounding the nozzle;
(b) inclined downwardly at an acute angle to the surface of the body of liquid;
(c) so placed as not to interfere with or inhibit the nozzle-jet;
(d) so configured as to receive the in-drawn surface-liquid, and the floatable solids entrained therein, and to direct the solids directly into the path of the nozzle jet.

the apparatus includes a fluid-pipe for delivering treatment fluid;

the fluid-pipe is so arranged relative to the ejector as to juxtapose the delivered fluid with the nozzle-jet of liquid, to such extent that the treatment-fluid, too, plunges to the floor of the tank, and becomes a component of the circulation-stream;

the liquid delivery pipe, the ejector, the baffles, and the fluid-pipe, are mounted on and supported by the physical structure of the tank, above the surface of the liquid in the tank.

17. Apparatus of claim 16, wherein the apparatus includes a support for mounting and supporting the liquid delivery pipe, the ejector, the baffles, the fluid-pipe, above the surface of the liquid.

18. Procedure for treating a body of wastewater or other liquid in a tank, including:
providing an apparatus which embodies claim 1;
operating the apparatus to establish the said circulation-stream.

* * * * *